Oct. 8, 1957     R. KAISER     2,809,056
PLURAL LAYER HOSE FITTING HAVING WEDGE
GRIPPING MEANS FOR THE PLURAL LAYERS
Filed Oct. 26, 1951
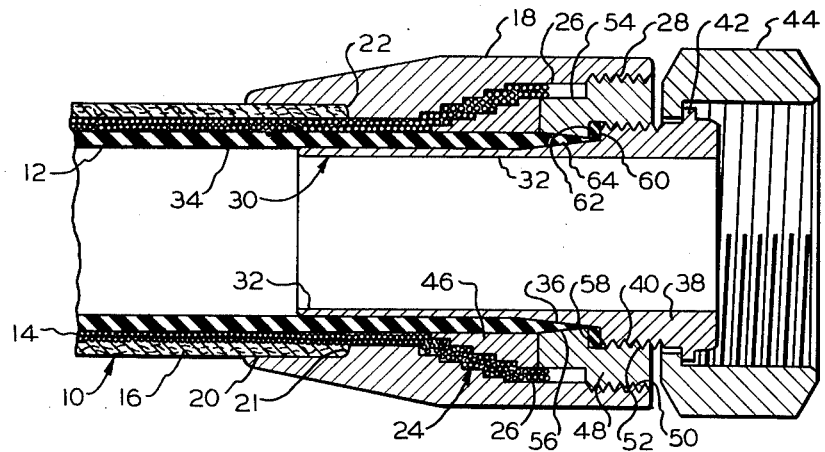
FIG. I.
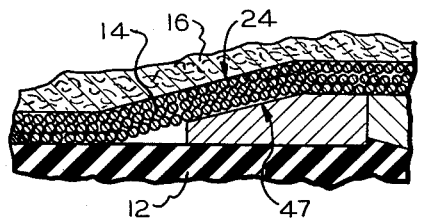
FIG. II.
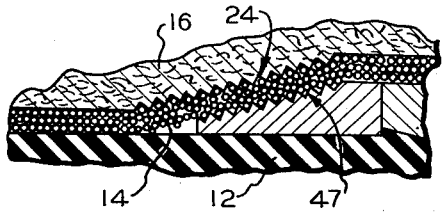
FIG. III.
INVENTOR
RUDOLF KAISER
BY *Jensen & Beaman*
ATTORNEY

United States Patent Office 2,809,056
Patented Oct. 8, 1957

2,809,056

PLURAL LAYER HOSE FITTING HAVING WEDGE GRIPPING MEANS FOR THE PLURAL LAYERS

Rudolf Kaiser, Ettlingen, Baden, Germany, assignor to Aeroquip Corporation, Jackson County, Mich., a corporation of Michigan Application October 26, 1951, Serial No. 253,238

2 Claims. (Cl. 285—149)

This invention relates to end fittings for flexible hose of the kind in which the end fitting comprises an outer socket and an inner nipple defining between them an annular recess in which an end portion of the hose is secured.

It is an object of this invention to provide an improved hose end fitting which is suitable for the attachment of relatively large diameter flexible hose and which provides that the hose end portion shall be held firmly secured between the end fitting socket and nipple parts in a fluid tight manner to prevent the escape of fluid from within the hose to the outside of the end fitting.

The above and other objects and advantages of the invention, residing in the construction, arrangement and combination of parts will become apparent from a consideration of the following description and the appended claims.

In the drawings:

Fig. I is a longitudinal section of one form of the invention,

Fig. II is a fragmentary section showing the socket and thrust ring parts of the end fitting with plain frusto-conical surfaces, and Fig. III is a similar view of Fig. II showing the socket and thrust ring with toothed frusto-conical surfaces.

Referring to the drawings, 10 indicates generally a length of flexible hose, which in this particular instance comprises an inner tube 12 of rubber or the like encased in a tubular layer of wire braid 14, which in turn is encased in an outer layer 16 of fabric.

The end fitting comprises a socket 18 having an end interior cylindrical bore portion 20 of a diameter approximating the external diameter of the outer hose layer 16 and terminating, within the socket interior, in an inwardly directed bevelled annular ledge 22 of a depth corresponding to the thickness of the hose layer 16. From this ledge the socket interior is formed with an outwardly directed frusto-conical bore portion, indicated generally at 24, followed by a cylindrical bore portion 26 of larger diameter than the cylindrical bore portion 20 and having a screw-threaded end portion 28.

The nipple part of the end fitting is indicated generally at 30 and has a reduced elongated cylindrical sleeve portion 32 of an external diameter approximating the diameter of the bore 34 of the hose, so that this nipple sleeve portion is capable of being slid into the hose bore from one end thereof, followed by an outwardly directed frusto-conical portion 36 and an end cylindrical portion 38 having an externally screw-threaded portion 40 and an outwardly directed radial flange 42 for retaining a connector lock nut 44 upon the nipple.

The end fitting also includes separate thrust and connector ring elements 46 and 48, respectively. The thrust ring element 46 is of an internal diameter corresponding to that of the external diameter of the hose inner tube 12. The external surface of this ring is of frusto-conical form, as indicated generally at 47, and is of a diameter less than that of the frusto-conical socket interior portion 24 by an amount approximating the thickness of the wire braid layer 14. The connector ring element 48 has an externally screw-threaded end portion 50, adapted for engagement with the socket threaded portion 28, and an internal screw-threaded portion 52, adapted for engagement with the nipple threaded portion 40. This connector ring element 48 is also formed with a reduced exterior end portion 54 and an interior annular frusto-conical end portion 56 presenting a radial annular wall 58 between which, and a corresponding wall 60 on the nipple, a fluid sealing ring 62 engages in the assembled condition of the end fitting.

The frusto-conical surfaces 24 and 47 may be of stepped formation as seen in Fig. I, plain as seen in Fig. II, or toothed as seen in Fig. III.

In assembling the end fitting upon the hose section 10 the end portion is first bared down to the wire braid layer 14, by removal of a portion of the outer fabric layer 16 a distance equal approximately to the length of the nipple sleeve portion 32, and the edge 21 of the leyer 16 is given a bevelled form. The thus exposed end portion of the braid 14 is also pulled away from the inner hose layer 12. Then the socket 18 is mounted upon the hose end, by its interior cylindrical portion 20 being slid axially upon the hose layer 16 until its bevelled surface 22 engages the bevelled edge surface 21 of the outer hose layer 16. Next the ring element 46, which forms in effect a thrust ring, is slid upon the exterior surface of the interior hose layer 12 and engaged between this layer and the separated end portion of the wire braid 14 by screwing the ring element 48 into the socket to cause the ring element 46 to be thrust axially to engage the separated braid portion firmly between the frusto-conical socket and thrust ring surfaces 24 and 47, respectively. Then the nipple is applied, by its sleeve portion 32 being slid into the bore 34 of the hose and by its screw-threaded end portion 40 being screwed into engagement with the screw-threaded interior 52 of the ring element 48. Prior to the application of the nipple, however, the sealing ring 62 is applied for sealing between the surfaces 58 and 60 as the nipple is screwed tightly into position. As this nipple tightening operation proceeds the end edge containing portion of the inner rubber hose layer 12 (such end edge containing portion being indicated at 64) will be deformed and confined between, and in engagement with, the bevelled surfaces 56 and 36 of the ring element 48 and the nipple respectively. This confined engagement of the hose end portion 64, together with the presence of the closely confined sealing ring 62, insures that there shall be no leakage of fluid, contained within the hose, between the nipple and the exterior of the hose end fitting.

Having thus described my invention what I claim as novel and wish to secure by Letters Patent is as follows:

1. In combination with a flexible hose having an inner tubular layer of rubber surrounded by an outer tubular layer of reinforcing material, such as wire braid, and in which to apply an end fitting for the hose it is necessary to separate the said hose layers along an end portion of the hose, of an end fitting comprising a socket having a screw-threaded opening at one end and an interior surface portion of decreasing diameter from the socket end with said opening towards the opposite end of the socket, said socket at said opposite end having an interior surface of a size capable of being slid axially over the exterior surface of the hose from one end thereof and said end fitting also including a nipple, a separate connector ring and a separate thrust sleeve completely housed within said socket, said connector ring having exterior screw-threading for engagement with said threaded socket opening and also having interior screw-threading in radial opposed relation to its exterior screw-threading and an inner thrust applying end wall, said thrust sleeve having an end wall for abutment by said thrust applying end wall of the connector ring, said thrust sleeve being insertible axially between the separated hose layers, the interior diameter of said thrust sleeve being substantially the same as the exterior surface of the inner hose layer and the exterior surface of said sleeve being of decreasing diameter from its said end wall to its opposite end, said thrust sleeve being capable of being forced axially between the separated hose layers by screwing said connector ring into said socket opening with said connector ring and thrust sleeve end walls in abutment, whereby to enable the separate reinforcement hose layer to be expanded into intimate contact with said interior socket portion of decreasing diameter prior to application of the nipple, said nipple having at one end a smooth tubular cylindrical portion of substantially the same external diameter as the internal diameter of said inner hose layer and having adjacent its other end an externally screw-threaded end portion engageable with the interior screw-threading on said connector ring, said nipple also having a tapered exterior surface portion between its ends for exerting outward with fluid sealing compression against the separated inner hose layer upon insertion of the nipple through said connector ring, said connector ring between its end wall and its interior threading having an interior axial wall in radial opposed relation to said tapered exterior surface portion of said nipple against which the inner hose layer is compressed, said nipple having its said other end projecting from said socket for making a fluid connection.

2. In the combination of claim 1 said interior axial wall of said connector in opposed relation to said tapered exterior surface of said nipple having a similar but opposed taper.

References Cited in the file of this patent

UNITED STATES PATENTS

| | | |
|---|---|---|
| 768,188 | McIntyre et al. | Aug. 23, 1904 |
| 1,298,303 | Dempsey | Mar. 25, 1919 |
| 1,819,243 | Hubbard | Aug. 18, 1931 |
| 2,280,140 | Wilson | Apr. 21, 1942 |
| 2,428,189 | Wolfram | Sept. 30, 1947 |
| 2,485,976 | Main | Oct. 25, 1949 |
| 2,583,956 | Lindsay et al. | Jan. 29, 1952 |
| 2,731,279 | Main | Jan. 17, 1956 |

FOREIGN PATENTS

| | | |
|---|---|---|
| 562,352 | Great Britain | June 28, 1944 |